United States Patent
Plank et al.

(10) Patent No.: US 9,672,150 B2
(45) Date of Patent: Jun. 6, 2017

(54) MIGRATING WRITE INFORMATION IN A WRITE CACHE OF A STORAGE SYSTEM

(75) Inventors: Jeffrey A. Plank, Cypress, TX (US); Joseph E. Foster, Houston, TX (US); Vincent Nguyen, Houston, TX (US); Robert E. Van Cleve, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1977 days.

(21) Appl. No.: 12/787,642

(22) Filed: May 26, 2010

(65) Prior Publication Data
US 2011/0296100 A1    Dec. 1, 2011

(51) Int. Cl.
| G06F 12/00 | (2006.01) |
| G06F 12/0804 | (2016.01) |
| G06F 11/16 | (2006.01) |
| G06F 11/20 | (2006.01) |
| G06F 12/0815 | (2016.01) |
| G06F 12/0866 | (2016.01) |

(52) U.S. Cl.
CPC ...... G06F 12/0804 (2013.01); G06F 11/1662 (2013.01); G06F 11/2094 (2013.01); G06F 11/2015 (2013.01); G06F 12/0815 (2013.01); G06F 12/0866 (2013.01)

(58) Field of Classification Search
CPC ............ G06F 12/0866; G06F 2212/31; G06F 2212/311; G06F 2212/312; G06F 2212/313; G06F 3/065; G06F 3/0647; G06F 11/1456; G06F 11/1451; G06F 11/2082; G06F 11/2056

USPC ................. 711/113, 115, 161, 162, E12.001, 711/E12.019; 714/6.1, 6.3
See application file for complete search history.

(56) References Cited

U.S. PATENT DOCUMENTS

| 5,771,367 A * | 6/1998 | Beardsley et al. ............ 711/162 |
| 6,516,380 B2 | 2/2003 | Kenchammana-Hoskote |
| 7,269,667 B2 | 9/2007 | Morishita |
| 7,313,651 B2 | 12/2007 | Li |
| 7,594,076 B2 | 9/2009 | Tsumagari |
| 8,099,569 B2 * | 1/2012 | Sugiura ......................... 711/161 |
| 2006/0069888 A1 * | 3/2006 | Martinez ....................... 711/162 |
| 2008/0250210 A1 * | 10/2008 | Ash et al. ..................... 711/141 |
| 2009/0125691 A1 * | 5/2009 | Nakanishi ..................... 711/162 |

(Continued)

OTHER PUBLICATIONS

Hewlett Packard, HP Smart Array 641 Controller brochure, DA-12067 12—Version 12—Sep. 5, 2007 (7 pages).

(Continued)

*Primary Examiner* — Reginald Bragdon
*Assistant Examiner* — Mehdi Namazi
(74) *Attorney, Agent, or Firm* — Trop, Pruner & Hu, P.C.

(57) ABSTRACT

To migrate data from a first storage system to a second storage system, the second storage system detects a migration of a persistent storage media from the first storage system to the second storage system. In response to detecting the migration of the persistent storage media, write information from a write cache in the first storage system is copied to a write cache in the second storage system, where the write caches in the first and second storage systems were not maintained synchronously before the write information from the write cache in the first storage system is copied to the write cache in the second storage system.

16 Claims, 4 Drawing Sheets

(56) References Cited

U.S. PATENT DOCUMENTS

2011/0185139 A1* 7/2011 Inoue et al. .................. 711/165
2012/0137096 A1* 5/2012 Maki et al. ................... 711/162

OTHER PUBLICATIONS

Cisco MDS 9000 Family Highlights: Storage Virtualization Series brochure, C02-495886-01—03/09 (10 pages).

* cited by examiner

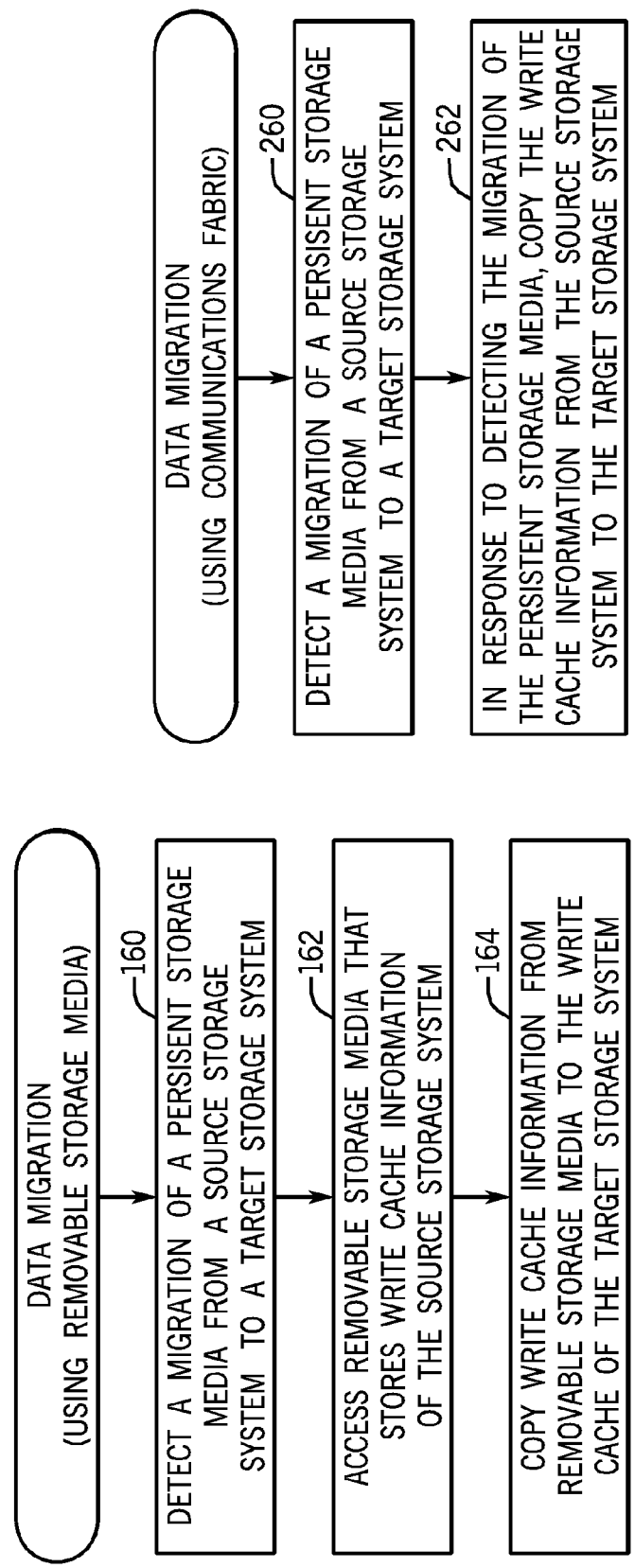

MIGRATING WRITE INFORMATION IN A WRITE CACHE OF A STORAGE SYSTEM

BACKGROUND

A storage system that stores data can be made available in a network for read and/or write access by one or multiple client devices. In some examples, a storage system can include an array of storage devices, such as disk-based storage devices, which are associated with a storage controller that handles requests for data in the storage devices. Frequently, a storage controller can be provided with a write cache to storage write information (including write requests and data associated with the write requests) for faster write processing.

The write cache is typically made persistent by connecting a backup power source, such as a battery, to the write cache, such that the content of the write cache is maintained even if the storage system were to lose power. Upon storing a write request and associated data into the write cache, the storage controller can respond to a client device with a completion indication (to indicate completion of the write request) even though the associated write data has not yet been written to the persistent storage devices of the storage system. The use of the write cache allows client devices to perceive write operations as completing faster than actually occurs at the storage system.

BRIEF DESCRIPTION OF THE DRAWINGS

Some embodiments are described with respect to the following figures:

FIGS. 1B, 2B, and 3 are flow diagrams of processes of migrating data between a source storage system and a target storage system, according to some embodiments.

DETAILED DESCRIPTION

Figure 1A:
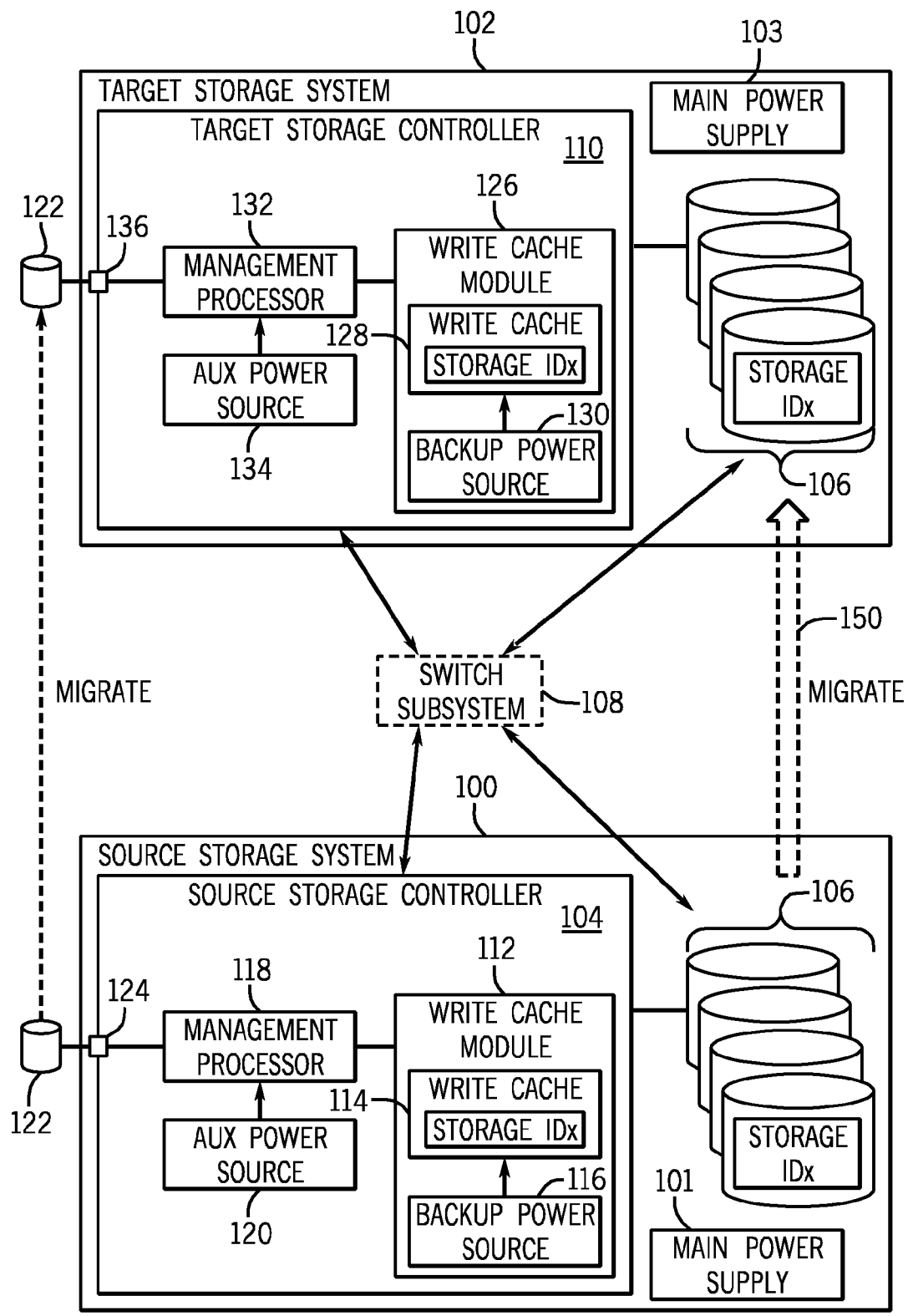
FIGS. 1A and 2A are schematic diagrams of example storage systems incorporating some embodiments.

In response to occurrence of an abnormal condition, it may be desirable to migrate data from a first (source) storage system to a second (target) storage system. Examples of abnormal conditions include the following: power is lost at the source storage system, a critical error occurs in software or hardware at the source storage system, or some other condition occurs that prevents normal operation of the source storage system. Migrating data from the source storage system to the target storage system involves either physically moving or electrically moving the persistent storage media (e.g., one or multiple disk-based storage devices or other types of persistent storage devices) of the source storage system to the target storage system. Physically moving storage media involves removing the storage media from the enclosure of the source storage system and installing the storage media in the enclosure of the target storage system, where the storage media is electrically connected to control elements of the target storage system. Electrically moving the storage media from the source storage system to the target storage system involves activating a switch subsystem to electrically disconnect the storage media from the source storage system and electrically connect the storage media to the target storage system—the storage media does not have to be physically moved in this latter scenario.

For improved write performance, a storage system can include a storage controller that has a write cache. This write cache is powered by an auxiliary or backup power source (such as a battery or some other source that is distinct from the main power supply of the storage system), such that even if power is removed from the storage system, the content of the write cache is maintained such that the write cache content can be replayed (or otherwise transferred) to persistent storage media at a later point in time. Conventionally, when migrating storage media from a source storage system to a target storage system, a write cache module including the write cache and the backup power source (e.g., battery) has to be physically moved from the enclosure of the source storage system to the enclosure of the target storage system. Disassembling the write cache module from the source storage system and installing the write cache module into the target storage system is a time-consuming process, which can be costly to perform.

Another conventional approach to data migration between storage systems is to use a synchronous cache-coherent solution in which a redundant backup storage controller is statically assigned to a primary storage controller, such that the content of the backup storage controller (including content of the write cache) is maintained synchronous with the content of the primary storage controller (in other words, the backup storage controller contains a mirror copy of the content of the primary storage controller). A synchronous, cache-coherent solution refers to an arrangement in which the content of the write cache in the redundant (backup) storage controller is maintained coherent with the content of the write cache at the primary storage controller (in other words, the content of the backup and primary write caches are maintained identical to each other). Such pairing of storage controllers (where a pre-existing, defined relationship has to be provided between the storage controllers) is expensive in terms of having to provide complex firmware to define the static tight coupling and cache coherency between the paired storage controllers, and reduces performance. Moreover, such a solution reduces flexibility when performing data migration.

In accordance with some embodiments, when performing migration from a source storage system to a target storage system upon detection of an abnormal condition, the persistent storage media (e.g., disk-based storage device(s) or integrated circuit storage device(s)) is migrated (electrically or physically) from the source storage system to the target storage system. A storage system can refer to any one of the following: a server that has a storage controller that performs various functions (including storage-related functions as well as other functions); a server having a electronic card that performs storage-related functions; a dedicated storage subsystem that only performs storage-related functions; and so forth.

Moreover, instead of physically moving the write cache module (including the write cache and the backup power source) from the enclosure of the source storage system to the enclosure of the target storage system, the data migration can be accomplished by copying the write information of the write cache in the source storage system to a "target storage" that allows migration of the content of the write cache to the target storage system. The write information of the write cache includes write requests as well as data associated with the write requests. In some implementations, the "target storage" to which the write information of the source write cache is copied can be removable storage media removably connected to a port of the source storage system to allow the write information of the source write cache to be copied into the removable storage media. The removable storage media can then be connected to a port of the target storage system to allow the write information in the removable storage media to be transferred to the write cache of the target storage system.

In alternative implementations, instead of using the removable storage media, a communications fabric can be provided between the storage controller in the source storage system and the storage controller in the target storage system, such that the write information in the write cache of the source storage system can be copied over the communications fabric to the target storage system. This "communications fabric" can be any communications link, wired or wireless, that allows the transfer of information between the source and target storage systems. In some examples, the communications fabric can be part of a management bus for performing various management tasks with respect to the storage systems. In other examples, the communications fabric can be a storage area network (SAN), a local area network (LAN), or some other type of network.

In implementations in which a communications fabric is provided between the source and target storage systems, the migration of the write cache content is initiated by the target storage system in response to the target storage system detecting the migration of the persistent storage media from the source storage system to the target storage system.

In the various embodiments discussed, the migration of write cache content from a source storage system to a target storage system is accomplished without having to specify a synchronized or coherent predefined relationship between the source and target storage systems. One example of such a synchronized or coherent predefined relationship is a tight coupling and/or cache coherency that is provided in a synchronous cache-coherent solution in which a redundant backup storage controller is assigned to a primary storage controller and in which the write caches of the backup storage controller and the primary storage controller are maintained coherent with each other. A source storage system and a target storage system are considered to not have a synchronized or coherent predefined relationship if either of the following apply: (1) no pre-existing relationship exists between the source and target storage systems, such that the migration can occur from the source storage system to any target storage system (selected from multiple candidate target storage systems); or (2) a pre-existing pairing is made between the source and target storage systems, but no active synchronization is performed between the source and target storage systems prior to the migration. As a result, greater flexibility is provided in migrating both persistent storage media and the content of a write cache, while avoiding having to physically move a write cache module between the source storage system and the target storage system.

FIG. 1A is a block diagram illustrating migration of data from a source storage system 100 to a target storage system 102. The source storage system 100 includes a source storage controller 104 that is connected to an array 106 of storage devices for persistently storing data of the source storage system 100. As indicated by dashed arrow 150, the array 106 of storage devices is being migrated from the source storage system 100 to the target storage system 102. As noted above, the migration can be performed by physically moving the array 106 of storage devices, or by electrically moving the array 106 of storage devices. Physically moving the array of storage devices involves moving the array of storage devices from an enclosure of the source storage system 100 to an enclosure of the target storage system 102. Each enclosure is represented by a box around the storage controller and array of storage devices, as shown in FIG. 1A.

Electrically moving the array 106 of storage devices from the source storage system 100 to the target storage system 102 involves activation of a switch subsystem 108 that is connected to the source and target storage controllers 104 and 110. The switch subsystem 108 electrically disconnects the array 106 of storage devices from the source storage controller 104, and electrically connects the array 106 of storage devices to the target storage controller 110. However, the physical location of the array 106 of storage devices does not change.

Although the storage devices (106) are shown as being contained within the enclosure of the respective source or target storage system, it is noted that in alternative implementations, the storage devices (106) are external to the enclosure of the storage systems. Moreover, instead of using an array 106 of storage devices, alternative implementations can employ singular storage devices.

As further shown in FIG. 1A, the source storage controller 104 includes a write cache module 112 that has a write cache 114 and a backup power source 116 (e.g., a battery). The backup power source 116 maintains power to the write cache 114 power even if a main power supply 101 of the source storage system 100 is removed (deactivated or experienced a failure or fault). Moreover, the source storage controller 104 also includes a management processor 118, which is connected to an auxiliary power source 120, where the auxiliary power source 120 is available even if the main power supply 101 is removed. The auxiliary power source 120 and the backup power source 116 can be the same in some implementations, or they can be different.

The management processor 118 is used for performing various management tasks associated with the source storage controller 104, including health monitoring, reconfiguration of the source storage controller 104, and so forth. In accordance with some embodiments, the management processor 118 is also used to perform data migration as discussed herein.

As shown in FIG. 1A, a removable storage media 122 (e.g., flash drive, disk-based drive, etc.) is connected to a port 124 of the source storage system 100. The port 124 can be any of the following: a Universal Serial Bus (USB) port; another type of serial port; a wireless port; a parallel port; or any other type of connection that enables communication between the removable storage media 122 and the source storage controller 104. As part of the migration process, the write information in the write cache 114 can be copied to the removable storage media 122. This transfer of information can be managed by the management processor 118.

To migrate the write information of the write cache 114 to the target storage system 102, the removable storage media 122 is disconnected from the source storage system 100 and connected to a port 136 of the target storage system 102 as shown in FIG. 1A.

The target storage controller 110 also includes a write cache module 126 that has a write cache 128 and a backup power source 130. In addition, the target storage controller 110 has a management processor 132 that is connected to an auxiliary power source 134. The auxiliary power source 134 and the backup power source 130 may be the same or they may be different. The target storage system 102 also includes a main power supply 103.

Once the removable storage media 122 is connected to the port 136, the management processor 132 can manage transfer of the write information of the removable storage media 122 into the write cache 128, such that the write information of the write cache 128 can be replayed (or otherwise transferred) to the array 106 of storage devices that has been migrated from the source storage system 100 to the target storage system 102.

FIG. 1B is a flow diagram of a data migration process according to some embodiments in which the removable storage media 122 is used. Data is to be migrated from the source storage system 100 to the target storage system 102. The target storage system 102 detects (at 160) a migration of a persistent storage media (e.g., array 106) from the source storage system 100 to the target storage system 102. After the removable storage media 122 has been connected to the port 136 of the target storage system 102, the target storage system 102 accesses (at 162) the removable storage media 122. Write information of the write cache 114 of the source storage system 100 was copied to the removable storage media 122. The target storage system 102 copies (at 164) the write cache information from the removable storage media 122 to the write cache 128 of the target storage system 102 to achieve migration of the write cache information from the source storage system 100 to the target storage system 102. The migrated write cache information corresponds to the migration of the persistent storage media 106 from the source storage system 100 to the target storage system 102.

Note that accessing the removable storage media 122 and copying of the write cache information from the removable storage media 122 to the write cache 128 of the target storage system 102 can be performed in response to user activation, or the accessing and copying can be performed automatically upon connection of the removable storage media 122 to the target storage system 102.

Figure 2A:
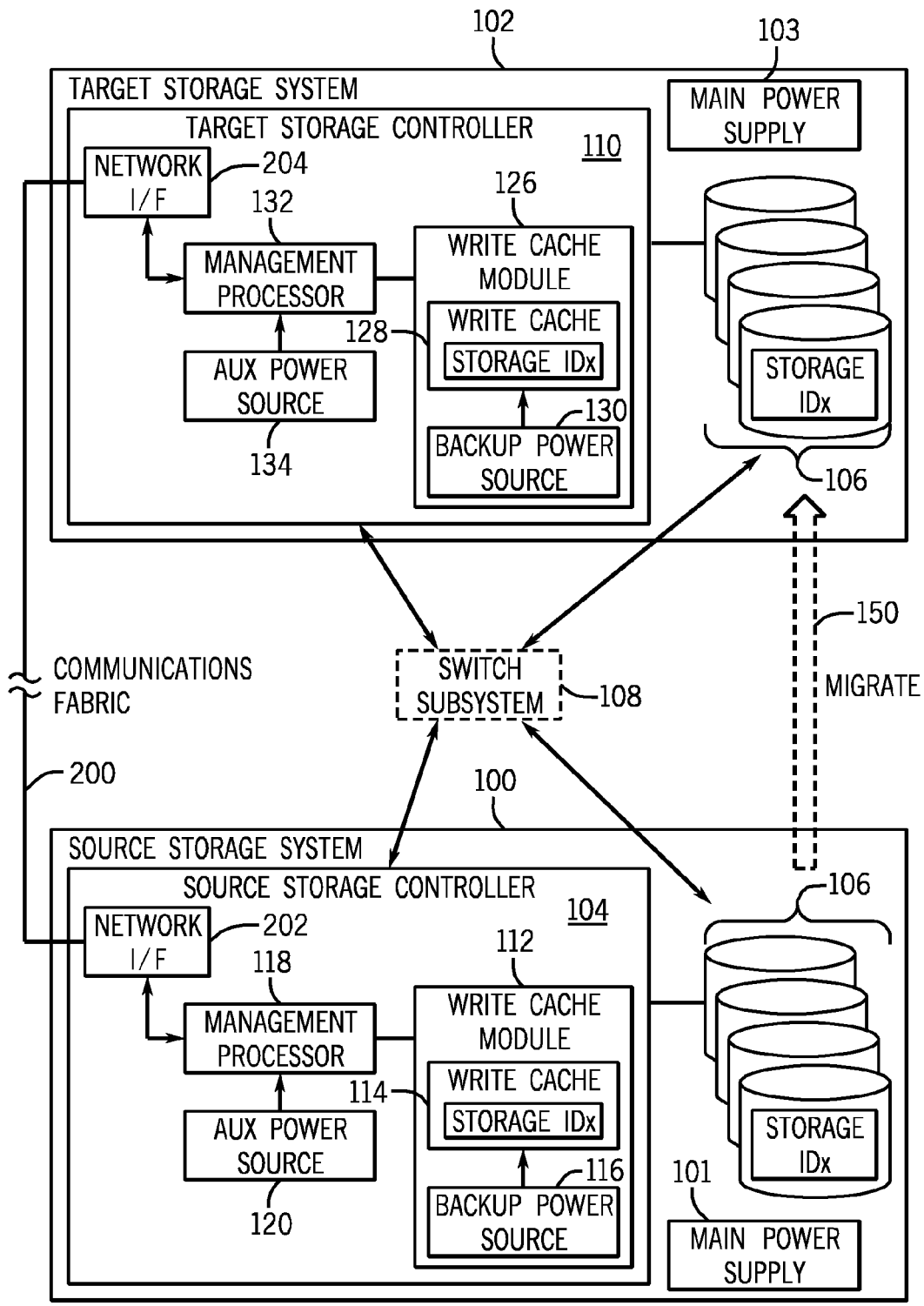

The solution depicted in FIG. 1A involves some user intervention, in that the user has to connect a removable storage media into the port 124 of the source storage system 100, and then move the removable storage media 122 to the target storage system 102 for connection to the target storage system 102. In alternative implementations, as shown in FIG. 2A, instead of using the removable storage media 122 of FIG. 1A, a communications fabric 200 is provided between the source storage controller 104 and the target storage controller 110.

The source storage controller 104 also includes a network interface 202 (which includes a network interface card and a communications protocol stack), to allow the source storage controller 104 to communicate with the communications fabric 200. The target storage controller 110 also includes a network interface 204 for connection to the communications fabric 200. Each of the management processors 118 and 132 is able to communicate over the communications fabric 200 through the respective network interface 202 or 204.

In response to detection of a migration of the persistent storage media (e.g., 106) from the source storage system 100 to the target storage system 102, the management processor 132 in the target storage controller 110 copies write information of the write cache 114 in the source storage controller 104 by communicating such write information over the communications fabric 200 from the source storage controller 104 to the target storage controller 110. The copied data is copied by the management processor 132 of the target storage controller 110 into the write cache 128 of the target storage controller 110. A benefit offered by implementations according to FIG. 2A is that a user does not have to manually be involved in physically moving an externally-connected removable storage media (e.g., 122 in FIG. 1A) from the source storage system 100 to the target storage system 102. Implementations according to FIG. 2A are able to leverage an existing communications fabric 200 between the management processors 118 and 132; for example, the communications fabric 200 can be used for performing other management tasks associated with the source and target storage systems 100 and 102.

FIG. 2B is a flow diagram of a data migration process according to some embodiments in which the communications fabric 200 is available between the source and target storage systems. The target storage system 102 detects (at 260) a migration of the persistent storage media (e.g., array 106) from the source storage system 100 to the target storage system 102. In response to detecting the migration of the persistent storage media (106), the target storage system copies (at 264) the write cache information from the write cache 114 of the source storage system 100 to the write cache 128 of the target storage system 102, over the communications fabric 200.

As further shown in each of FIGS. 1A and 2A, the write cache 114 and the array 106 of storage devices are associated with a particular storage ID, which in the example of FIG. 1A or 2A is "storage IDx." When the write information of the write cache 114 in the source storage controller 104 is migrated to the write cache 128 in the target storage controller 110, the same storage IDx is maintained, such that the content of the write cache 128 can be correlated to the migrated array 106 of storage devices, which continues to be assigned storage IDx.

According to some embodiments, in each of FIGS. 1A and 2A, the source and target storage systems 100 and 102 are non-coherent systems—in other words, prior to data migration, the content of the write cache 128 of the target storage controller 110 is non-coherent (in other words does not contain the same information) with respect to the content of the write cache 114 in the source storage controller 104. Thus, according to such embodiments, complex firmware does not have to be provided to maintain cache coherency between the source and target storage controllers, and a static tight coupling does not have to be defined for the pair of storage systems.

Moreover, according to some embodiments, the data migration can be performed in a relatively efficient manner since the write cache module 112 of the source storage system does not have to be physically moved to the target storage system 102. Flexibility is also enhanced since the data of the source storage system 100 can be moved to any other target storage system in some implementations.

Figure 3:
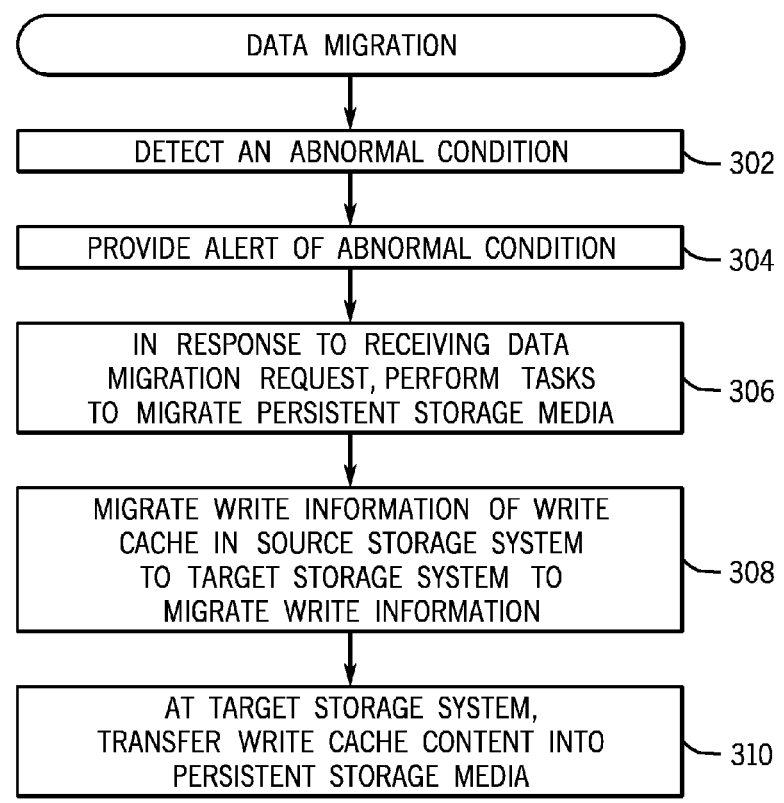

FIG. 3 is a flow diagram of a process of performing data migration according to further embodiments. The source storage system 100 detects (at 302) an abnormal condition that indicates that data should be migrated from the source storage system 100 to a target storage system 102. An alert of the abnormal condition is provided (at 304) by the source storage system 100, where this alert can be sent to a system administrator or other user, for example. Alternatively, instead of sending the alert to a user, the alert can be sent to another type of entity, such as a management computer or other type of electronic device.

The entity receiving the alert can decide based on the alert whether or not to initiate data migration from the source storage system to the target storage system. The entity receiving the alert can issue a data migration request (or other indication) in response to determining that the data migration should be initiated. Alternatively, instead of being issued by the entity receiving the alert, the data migration request (or other indication) can be an automatically generated within the source storage system 100, such as by the management processor 118 of the source storage controller 104 upon detection of the abnormal condition.

In response to receiving the data migration request (or other migration indication), tasks are performed (at 306) to migrate the persistent storage media (e.g., array 106 of storage devices shown in FIG. 1A or 2A) from the source storage system to the target storage system. The migration of the persistent storage media can involve physical movement of the persistent storage media, or electrical switching of the persistent storage media from the source storage system to the target storage system.

Next, the write information of the write cache in the source storage system is migrated (at 308) to the target storage system, using either the removable storage media 122 shown in FIG. 1A or the communications fabric 200 shown in FIG. 2A. The storage controller 110 of the target storage system 102 then transfers (at 310) the write information in the write cache 128 of the target storage controller 110 into the persistent storage media that has been migrated from the source storage system to the target storage system.

Some of the tasks performed in FIG. 1B, 2B, or FIG. 3 can be performed by machine-readable instructions, which are executable on the management processor 118 or 132 or on the storage controller 104 or 110.

The machine-readable instructions are loaded for execution on a hardware processor. The processor can include a microprocessor, microcontroller, processor module or subsystem (including one or multiple microprocessors or microcontrollers), or another control or computing device. As used here, a "processor" can refer to a single component or to plural components (e.g., one CPU or multiple CPUs).

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variation.

What is claimed is:

1. A method of performing data migration from a first storage system to a second storage system, comprising:
    detecting, at the second storage system, a migration of a persistent storage media from the first storage system to the second storage system, the migration comprising one of physically moving the persistent storage media from an enclosure of the first storage system to an enclosure of the second storage system, and electrically switching the persistent storage media from the first storage system to the second storage system by activating a switch subsystem to disconnect the persistent storage media from the first storage system and connect the persistent storage media to the second storage system; and
    in response to detecting the migration of the persistent storage media, copying write information from a write cache, separate from the persistent storage media, in the first storage system to a write cache in the second storage system, wherein the write caches in the first and second storage systems were not maintained synchronously before the write information from the write cache in the first storage system is copied to the write cache in the second storage system.

2. The method of claim 1, wherein copying the write information to the write cache in the second storage system is performed over a communications fabric between the first and second storage systems.

3. The method of claim 1, wherein copying the write information from the write cache in the first storage system to the write cache in the second storage system comprises:
    copying the write information from the write cache in the first storage system to a removable storage media;
    moving the removable storage media from the first storage system to the second storage system; and
    copying the write information from the removable storage media to the write cache in the second storage system.

4. The method of claim 1, wherein the detecting and the copying are managed by a processor of the second storage system.

5. The method of claim 1, further comprising using a particular identifier to correlate content of the write cache in the second storage system to content of the persistent storage media after the migration.

6. The method of claim 1, wherein the write information is associated with write requests for writing data to the persistent storage media.

7. The method of claim 1, wherein the copying is initiated in response to user activation.

8. The method of claim 1, wherein the copying is automatically performed by the second storage system upon detection of the migration of the persistent storage media.

9. The method of claim 1, wherein the copying of the write information is performed without moving the write cache in the first storage system to the write cache in the second storage system.

10. A target storage system comprising:
    a write cache to store write information associated with write requests for writing data to a persistent storage media, the write cache separate from the persistent storage media; and
    a processor configured to:
        detect a migration of the persistent storage media from a source storage system to the target storage system, wherein the write cache in the target storage system is non-coherent with respect to a write cache in the source storage system prior to the migration, the migration based on physically moving the persistent storage media from an enclosure of the source storage system to an enclosure of the target storage system; and
        migrate, in response to detecting the migration of the persistent storage media, write information in the write cache of the source storage system to the write cache of the target storage system.

11. The target storage system of claim 10, wherein the migration of the write information is performed by communicating the write information over a communications fabric interconnecting the source and target storage systems.

12. The target storage system of claim 10, wherein a particular identifier is useable to correlate content of the write cache in the target storage system to content of the persistent storage media after the migration.

13. The target storage system of claim 10, wherein the migrating of the write information is performed without moving the write cache in the source storage system to the target storage system.

14. An article comprising at least one non-transitory computer-readable storage medium storing instructions that upon execution cause a processor of a target storage system to:
   detect a migration of persistent storage media from a source storage system to the target storage system, the migration comprising one of physically moving the persistent storage media from an enclosure of the source storage system to an enclosure of the target storage system, and electrically switching the persistent storage media from the source storage system to the target storage system by activating a switch subsystem interconnecting the source and target storage system, the activating of the switch subsystem disconnecting the persistent storage media from the source storage system and connecting the persistent storage media to the target storage system;
   copy, in response to detecting the migration of the persistent storage media, write information in a write cache, separate from the persistent storage media, of the source storage system to a write cache of the target storage system, wherein the write caches in the source and target storage systems were not maintained synchronously before the write information in the write cache of the source storage system is copied to the write cache of the target storage system; and
   correlate the migrated write information in the write cache of the target storage system to the migrated persistent storage media.

15. The article of claim 14, wherein copying the write information comprises copying the write information over a communications fabric between the source and target storage systems.

16. The article of claim 14, wherein the copying of the write information is performed without moving the write cache in the source storage system to the target storage system.

* * * * *